(12) United States Patent
Corcoran et al.

(10) Patent No.: US 11,892,107 B2
(45) Date of Patent: Feb. 6, 2024

(54) COMPOUNDING LOCKING RING FOR PIPE JOINTS

(71) Applicant: United States Pipe and Foundry Company, LLC, Birmingham, AL (US)

(72) Inventors: Cameron Anderson Corcoran, Trussville, AL (US); Jerry Gregory Key, Bessemer, AL (US); Jay Derek Caston, Birmingham, AL (US)

(*) Notice: Subject to any disclaimer, the term of this patent is extended or adjusted under 35 U.S.C. 154(b) by 1 day.

(21) Appl. No.: 17/220,623

(22) Filed: Apr. 1, 2021

(65) Prior Publication Data

US 2022/0316633 A1    Oct. 6, 2022

(51) Int. Cl.
*F16L 21/08* (2006.01)
*F16L 21/00* (2006.01)

(52) U.S. Cl.
CPC .............. *F16L 21/08* (2013.01); *F16L 21/007* (2013.01)

(58) Field of Classification Search
CPC ......... F16L 21/08; F16L 21/007; F16L 37/10; F16L 37/101; F16L 37/12; F16L 37/123; F16L 37/08; F16L 37/14; F16L 37/148; F16L 37/15; F16L 37/138; F16L 37/086
USPC ....................................................... 285/305
See application file for complete search history.

(56) References Cited

U.S. PATENT DOCUMENTS

| | | | |
|---|---|---|---|
| 1,043,294 A | 11/1912 | Brinkop | |
| 1,075,693 A | 10/1913 | Cassidy | |
| 2,543,088 A | 11/1947 | Woodling | |
| 2,438,529 A | 3/1948 | Woodling | |
| 4,012,059 A | 3/1977 | Luke et al. | |
| 4,153,278 A | 5/1979 | Ahlstone | |
| 4,540,204 A * | 9/1985 | Battle | F16L 21/08 285/403 |
| 5,197,768 A | 3/1993 | Conner | |
| 2005/0067836 A1 | 3/2005 | Copeland | |
| 2008/0007057 A1 | 1/2008 | Schmuck et al. | |
| 2016/0003386 A1 | 1/2016 | Bechis | |
| 2018/0292033 A1 | 10/2018 | Kishi et al. | |
| 2019/0309882 A1 | 10/2019 | Huggins et al. | |

FOREIGN PATENT DOCUMENTS

| | | |
|---|---|---|
| CN | 105065811 B | 5/2017 |
| DE | 3241750 A1 | 11/1982 |
| DE | 3618485 A1 | 1/1987 |
| EP | 3096059 B1 | 7/2019 |
| FR | 1246290 A | 11/1960 |
| FR | 2324975 A1 | 4/1977 |
| GB | 937409 | 9/1963 |
| KR | 101525074 B1 | 6/2015 |
| WO | 2018/172922 A1 | 9/2018 |

OTHER PUBLICATIONS

International App. No. PCT/US2022/022075, International Search Report and Written Opinion of the International Searching Authority, dated Jun. 21, 2022.

* cited by examiner

*Primary Examiner* — Aaron M Dunwoody
(74) *Attorney, Agent, or Firm* — Jacob W Neu; Bradley Arant Boult Cummings, LLP

(57) ABSTRACT

A pipe joint having a compound locking ring is disclosed herein. The pipe joint bell has a a segment cavity into which ring segments may be inserted through a slot on the face or outer surface of the bell end of a first pipe. The locking ring has multiple ring segments, each segment having an arcuate outer surface. The outer surface may be a compound surface of multiple arcs.

7 Claims, 8 Drawing Sheets

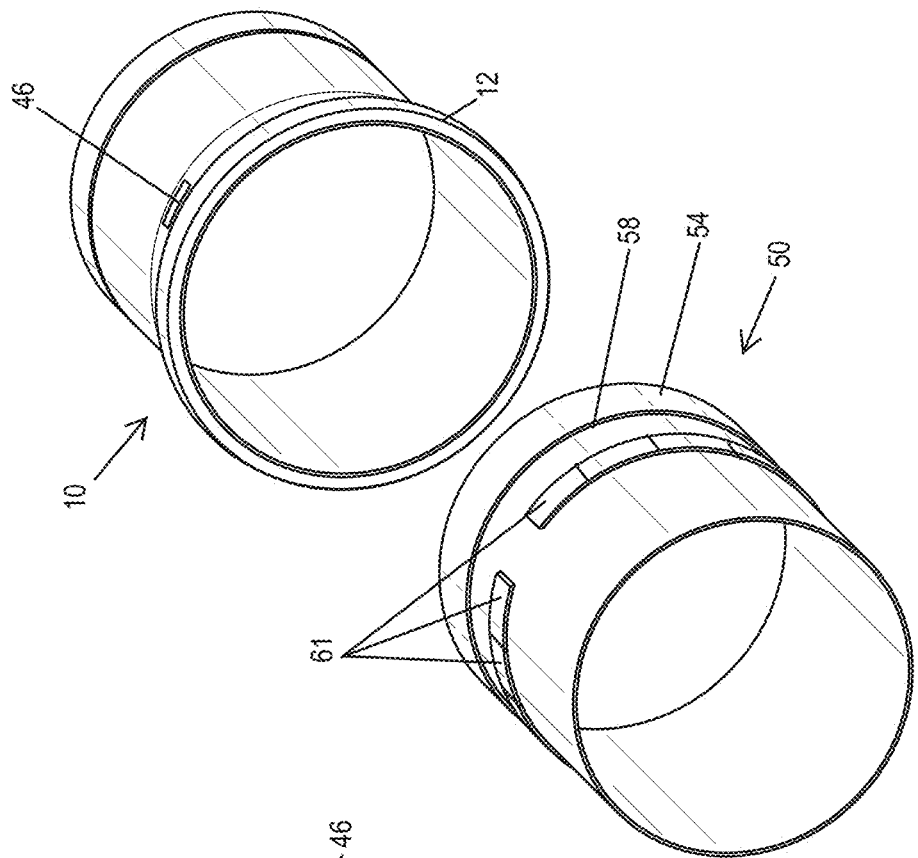
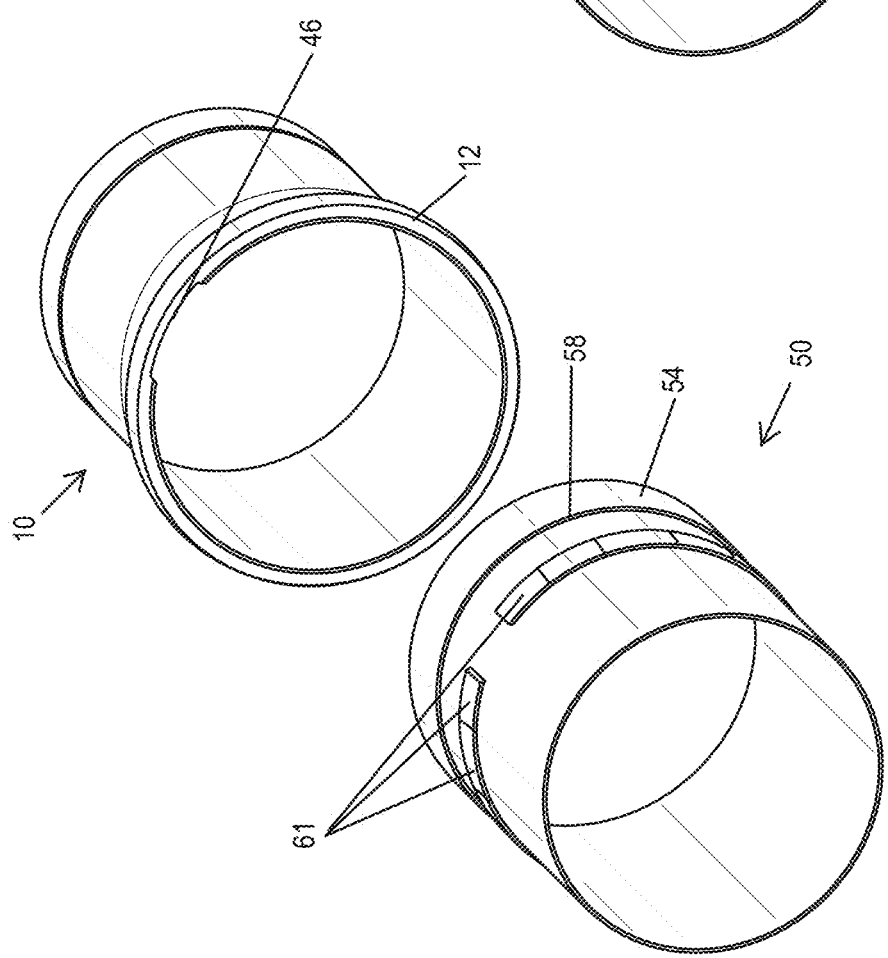

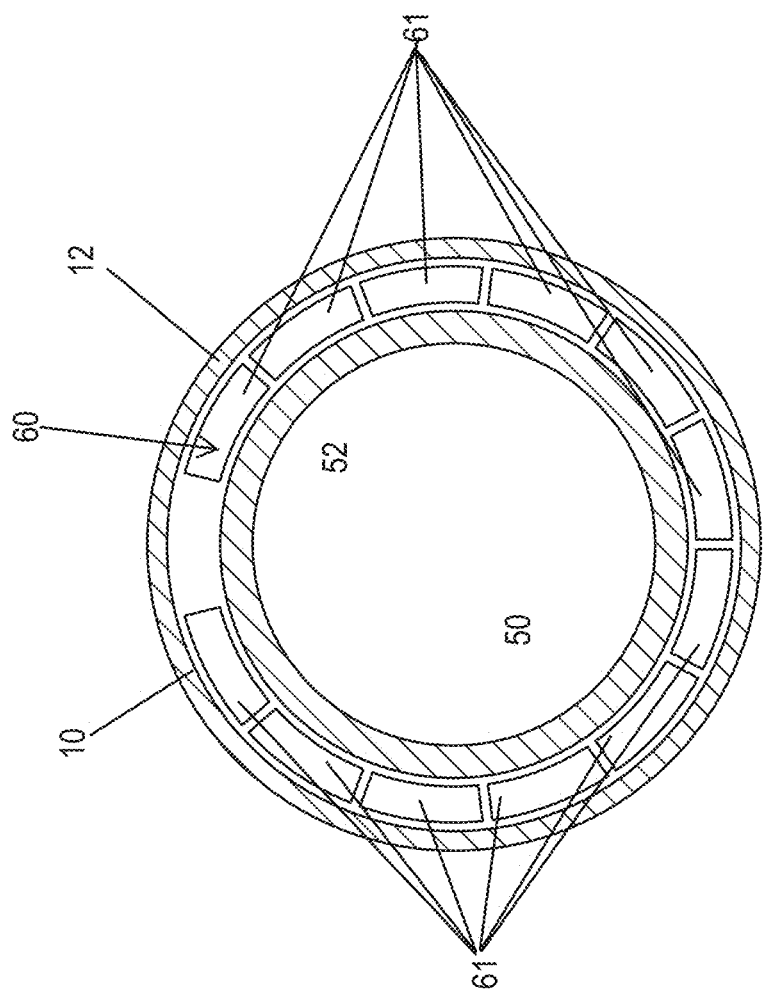

COMPOUNDING LOCKING RING FOR PIPE JOINTS

BACKGROUND ART

One common joint design for pipes used in buildings, infrastructure, and pipeline projects, such as ductile iron pipes, is a spigot-bell pipe joint. In broad terms, one pipe in the joint has a bell end, which is flared outward radially and has a socket, and the second pipe has a spigot end that is inserted into the socket of the bell. A gasket is inserted between the bell and spigot to seal the pipes. A locking ring is also inserted into the joint to prevent the pipes from disjoining due to oblique or longitudinal forces acting on the pipes.

While a spigot-bell joint provides a strong joint for applications involving high interior pipe pressure, one limitation is that the joint does not provide significant deflection capability in the event of an oblique or lateral force acting on joint that might cause a bending moment around the joint. A new joint design that allows the joint to deflect under oblique or lateral forces is desired.

SUMMARY OF THE INVENTION

In some respects the disclosure concerns a compound locking ring for insertion into a pipe joint defined by a spigot end of a first pipe and a bell of a second pipe, the spigot end having a weld bead on a spigot exterior surface and the bell having a narrow open end and a longitudinally arcuate bell internal surface, the compound locking ring having multiple ring segments, each ring segment having a circumferentially arcuate inner surface, a notch defined to engage the weld bead, and a longitudinally arcuate outer surface corresponding to the bell internal surface.

In additional respects the disclosure concerns a set of locking ring segments for use in forming a locking ring inserted into a segment cavity defined by an outer surface of a spigot end of a first pipe and an inner surface of a bell of a second pipe, each locking ring segment having a circumferentially arcuate inner surface corresponding to the outer surface of the spigot, a longitudinally arcuate outer surface corresponding to the inner surface of the bell, a lead edge formed by the junction of the arcuate inner surface and the arcuate outer surface, a rear face, and a notch between the inner surface and the rear face.

In additional respects the disclosure pipe joint system having a first pipe having a bell end with an outer bell surface; an inner bell surface defining a lug mouth, a segment cavity, a throat, and a protrusion on a cavity-facing side of the throat, and a slot positioned over and permitting access to the segment cavity; a second pipe having a spigot end with an outer spigot surface and a weld bead extending circumferentially around the outer spigot surface; and a plurality of ring segments insertable into the slot and having a circumferentially arcuate inner surface, a notch defined to engage the weld bead, and a longitudinally arcuate outer surface corresponding to the inner bell surface on the segment cavity.

In additional respects the disclosure a method for forming a locking ring in a pipe joint having the steps of providing a first pipe having a bell end with an outer bell surface, an inner bell surface defining a segment cavity, and a slot positioned over and permitting access to the segment cavity; providing a second pipe having a spigot end with an outer spigot surface and a weld bead extending circumferentially around the outer spigot surface; inserting the spigot end of the second pipe into the bell end of the first pipe to a distance the slot is longitudinally beyond the weld bead; inserting multiple ring segments into the slot, wherein each ring segment has a circumferentially arcuate inner surface corresponding to the outer spigot surface and retaining bead, and a longitudinally arcuate outer surface corresponding to the segment cavity, such that the multiple ring segments form a compound ring extending circumferentially around the spigot; and sealing the slot.

BRIEF DESCRIPTION OF THE FIGURES

FIG. 2A depicts an exterior perspective view of a joint according to an embodiment of the invention.

FIG. 2B depicts an exterior perspective view of a joint according to another embodiment of the invention.

FIG. 4 depicts a cut-through view of the joint showing the compound locking ring placed in the joint.

DETAILED DESCRIPTION OF THE EMBODIMENTS

For purposes of describing orientation and direction in all the figures, the longitudinal axis or direction refers to the axis or direction passing parallel along the length of the pipe. The radial axis or direction refers to an axis or direction beginning along the midline of the pipe and extending radially outward in a given direction. The circumferential direction refers to passing circumferentially around the pipe.

Figure 1:
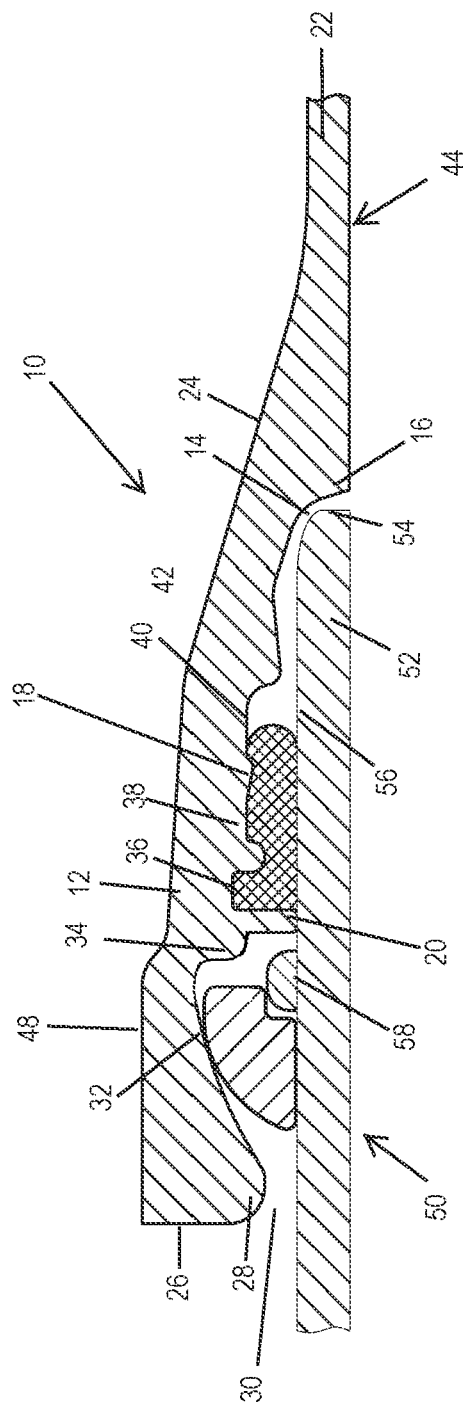
FIG. 1 depicts a profile cut-through view of a joint according to an embodiment of the invention.
Figure 3B:
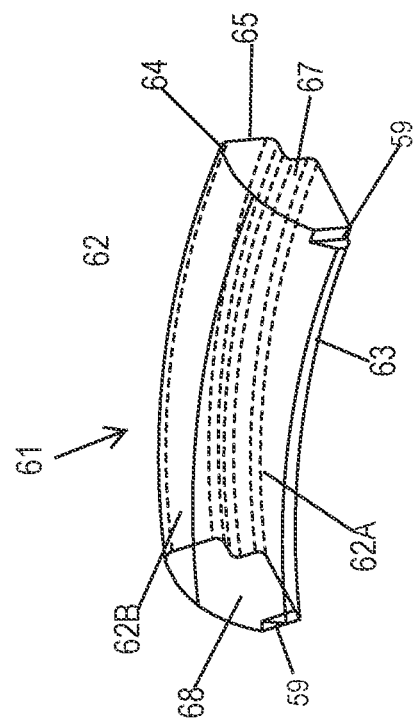
FIGS. 3A through 3D depict different views of a single locking ring segment according to an embodiment of the invention.
Figure 3D:
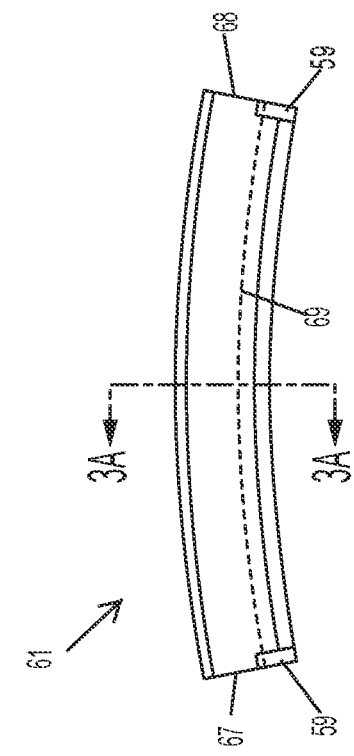
Figure 3A:
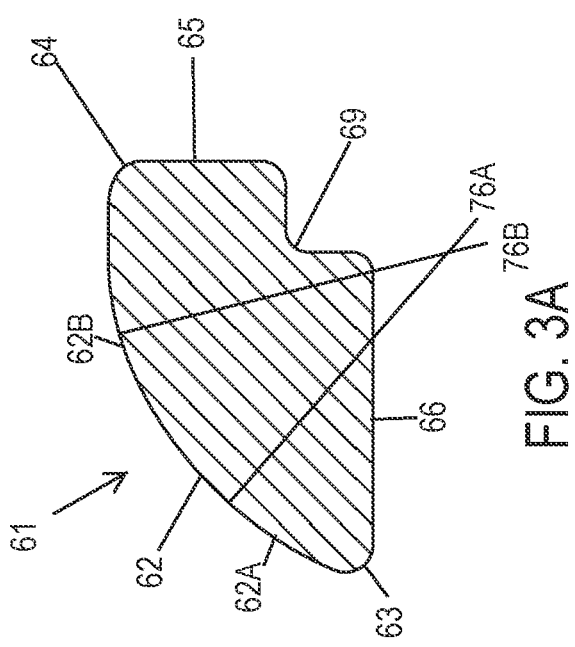
Figure 3C:
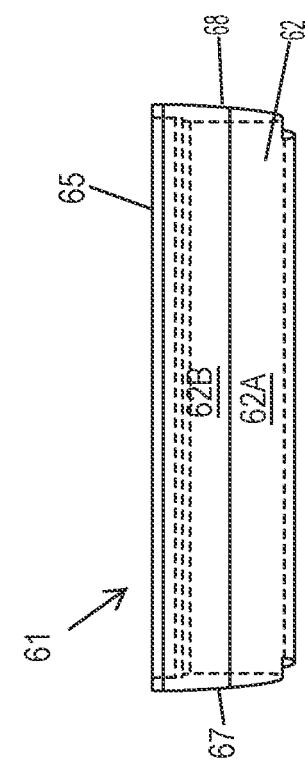

FIG. 1 depicts a profile cut-through view of a spigot-bell pipe joint. Such pipe joints are often used for ductile iron pipe joints but may be used in other pipe joints as well. The spigot-bell pipe joint is broadly defined as one in which the bell end 12 of a first pipe 10 receives the spigot end 52 of a second pipe 50. The bell 12 has a receiving end fashioned to receive the spigot end 52 of a second pipe 50. The fashioned internal portion of the bell 12 is the socket 14. The beveled leading edge 54 of the spigot end 52 is the spigot 54. When joined the bell 12 overlaps the spigot end 12, with the spigot 54 seated at the base 16 of the socket 14. Each pipe has an exterior surface and an interior surface. When joined as shown in FIG. 1, the exterior surface 56 of the spigot end 52 of the second pipe 50 fits within the interior surface 18 of the bell end 12 of the first pipe 10. The exterior surface 56 of the spigot end 52 is typically smooth and has a uniform diameter, except for the addition of a weld bead 58 placed some distance from the spigot 14. The weld bead 58 extends circumferentially around the entirety of the spigot end 52. The weld bead 58 is sized to push against the throat 20 of the bell end 12 to prevent longitudinal movement of the spigot 54 into the socket 14 of the bell 12 beyond a desired distance, as further movement would cause the spigot 54 to contact the socket 14 and possibly break the bell 12.

The bell end 12 of the first pipe 10 has a larger diameter than the body 22 of the first pipe 10. A transition region 24 expands from the body 22 to the maximum diameter of the bell end 12. The transition region 24 may be tapered, as shown in FIG. 1, or it may be an abrupt widening to the bell end diameter. The bell end interior surface 18 has multiple grooves and ridges extending circumferentially around the interior surface. At the very end of the bell end 12 is the face 26, which faces longitudinally and curves down into a locking lug 28. The smallest circumference of the locking lug 28 forms the lug mouth 30, through which the spigot end 52 of the second pipe 50 is inserted. The lug mouth 30 has a relatively small diameter that is not very much larger than the spigot outer surface diameter. Just inside the lug mouth 30, the bell end inner surface 18 expands into a segment cavity 32. The segment cavity 32 is sized to accommodate the locking ring segments 61, which will be described more fully below. The segment cavity 32 also passes over the weld bead 58 of the spigot end 52 when the spigot 54 and bell 12 are fully joined. The inner surface 18 of the bell end 12 then narrows again to come very close to the outer surface 56 of the spigot end 52. This narrow section is the throat 20. The weld bead 58 abuts against the throat 20 when the pipes are fully joined. Also depicted in FIG. 1 is a protrusion 34 on the inner bell surface that extends into the segment cavity.

From the throat 20, the inner surface expands again to form a retainer seat 36 to receive the retainer 74 of a gasket heel 72. The inner surface 18 narrows to form a retainer bead 38 before expanding again to form a gasket seat 40. Wedged between the outer surface 56 of the spigot end 52 on the one hand and the retainer seat 36, retaining bead 38, and gasket seat 40 is a gasket 70. The gasket 70 forms a seal between the inner surface 18 of the bell end 12 and the outer surface 56 of the spigot end 52. The gasket retainer 74 fits in the retainer seat 36, and the rest of the gasket 70 fits around the retainer bead 38 and into the gasket seat 40. Beyond the gasket seat there may be portion of the bell 12 that extends inward above the base 16 of the socket 14 called the land 42. At the base 16 of the socket 14 the inner surface 18 narrows to the uniform body diameter of the inner surface 44 of the pipe body 22.

The inner bell surface 18 and the outer spigot surface 54 do not directly contact each other once the joint is formed. Instead, the compound locking ring 60 and the gasket 70 contact both the bell end 12 and the spigot end 52. The gasket 70 seals the pipe to prevent leaks at the joint. The gasket 70 used in connection with this disclosure may be formed of any materials or composite that are conventional or appropriate for use in sealing joints. The compound locking ring 60 prevents the pipes from disconnecting in the event of longitudinal tension forces acting on the pipes. The compound locking ring 60 may be formed of a metal or metallic alloy capable of withstanding high compression stress.

The compound locking ring 60 sits within the segment cavity 32. The compound locking ring 60 engages the inner bell surface 14, the outer spigot surface 56, and the weld bead 58. Once installed within the joint, the compound locking ring 60 prevents the joined pipes from separating.

The compound locking ring 60 is composed of multiple ring segments 61. These ring segments 61 may be inserted into the segment cavity 32 after the spigot end 52 has been fully inserted into the bell 12.

Figure 7:
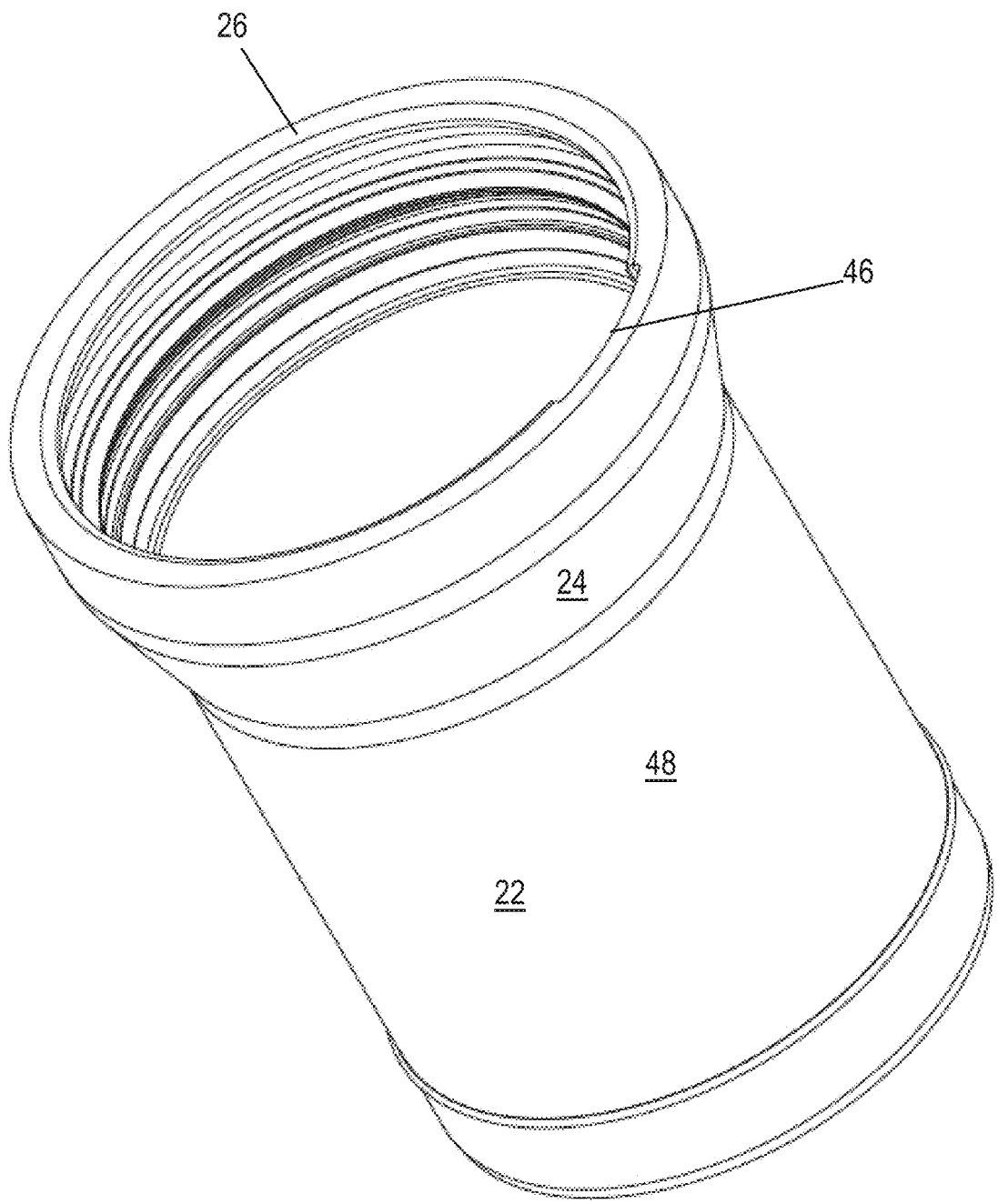
FIG. 7 depicts an exterior view of the bell end of a pipe according to an embodiment of the invention.

The slot 46 for inserting the ring segments 61 into the segment cavity 32 may be provided in multiple ways. For example, as shown in FIG. 2A, the slot 46 may be provided on the face 26 of the bell, between the lug mouth 30 and the exterior bell surface 56. FIG. 7 also depicts the bell 12 of the first pipe 10 with the slot 46 on the face of the bell 12, in isolation. In another embodiment as shown in FIG. 2B, the slot 46 may be located radially outward of the segment cavity 32 and connecting directly to the exterior bell surface 48. The slot 46 extends circumferentially a given distance around the bell 12. The slot 46 should be sized to be small enough such that it does not materially affect the integrity of the bell end 12 of the first pipe 10. Otherwise, there is no specific limitation to the potential size of the slot, although it may be preferred that the slot be as large as possible (so long as within the constraints required by the integrity of the pipe) so that the number of locking ring segments 61 to be inserted into the segment cavity 32 may be minimized. It has been found that in general a slot 46 having an arc measure of about 20 degrees to about 25 degrees provides a large enough slot to reduce the number of ring segments 61 for forming the compound locking ring 60 to about 15 while also not comprising the integrity of the pipe.

FIGS. 3A-3D depict multiple views of an individual locking ring segment 61. The locking ring segment 61 has an outer segment surface 62 that is substantially molded to engage with the segment cavity 32 of the inner bell surface 18. The outer segment surface 62 is arcuate to permit the segment cavity surface 32 and the outer arcuate surface 62 to slide past each other in the event of a pipe deflection, as will be discussed further below. The outer segment surface 62 terminates in a lead edge 63, which is closest to the lug mouth 30 of the bell 12, and a trailing edge 64, which is the edge between the outer segment 62 surface and the rear face 65. Both the lead edge 63 and the trailing edge 64 may be chamfered or rounded, as shown in FIGS. 3A-3D. Alternatively the lead edge 63 and the trailing edge 64 may be pointed or a sharp edge. A chamfered or rounded edge is preferred, as a pointed or sharp edge may project outward into the sliding space between the ring segment 61 and the segment cavity 32, thereby limiting the amount of deflection that is permitted.

The inner segment surface 66 is parallel to the outer spigot surface 56. The right-side face 67 and the left-side face 68 connect the outer arcuate surface to the segment ring surface. As depicted, each side face is substantially perpendicular to the circumferential direction, however, it is not necessary that the side faces be perpendicular or even flush to each other when in contact with adjacent locking ring segments 61. As a non-limiting example, in the embodiment shown in FIGS. 3A-3D, the locking ring segment 61 has a small notch 59 in a corner of each side face. The inventors have found that the small notch 59 permits an operator to manipulate or reorient the locking ring segment 61 if needed. The small notch 59 also facilitates disassembly of the joint by manipulating the locking ring segment 61 to remove it, in a reversal of the assembly process. The rear face 65 is substantially perpendicular to the longitudinal direction. Between the inner ring surface 66 and the rear face 65 is a large notch 69 shaped to engage the weld bead 58 on the outer spigot surface. The body of the locking ring segment 61 is curved or arched circumferentially such that the two side faces are perpendicular to the circumferential direction and parallel to the radial direction.

To install the compound locking ring 60, each ring segment 61 is inserted into the slot 46. The ring segments 61 are slid around the segment cavity 32 to permit additional ring segments 61 to be inserted. When all ring segments 61 have been inserted, each ring segment 61 abuts the adjacent segments 61 to form a complete compound locking ring 60 within the segment cavity 32. This configuration is shown in FIG. 4. The slot 46 may then be sealed to prevent a segment 61 from slipping out through the slot 46.

The arcuate outer segment surface 62 and the similarly arcuate inner bell surface in the segment cavity 32 are cast in a manner to allow the outer ring surface 62 and the inner bell surface of the segment cavity 32 to slide past each other in the event of forces acting on the joint to break or dislodge the joint. For example, when an oblique force is applied at the pipes forming the joint, the force will tend towards buckling the pipes at the joint, causing a deflection in the angle of the pipes. The compound locking ring 60 and the segment cavity 32 are curved such that the pipes are permitted to deflect some amount under the force without breaking the seal or bursting the pipe. The geometry of the compound locking ring and how the ring segments slide along the cavity also vary the amount of the load that is transformed from oblique to longitudinal loads as the angle of deflection increases.

In some embodiments, the arcuate outer segment surface 62 may be a compound surface formed of multiple distinct arc segments. That is, there may be multiple arcuate segments. For some of these embodiments, the joining line between two adjacent arcuate segments may be continuous, such that there is continually curved surface where the two adjacent arc segments meet. In other embodiments, such as that depicted in FIGS. 3A-3D, the curve may be discontinuous, such that the two adjacent arc segments 62A and 62B meet in an edge. With the arcuate outer segment surface 62 having a compound surface, the locking ring segment 61 can have additional space to deflect within the segment cavity 32. As a non-limiting example, in the embodiment shown in FIGS. 3A-3D, the arcuate outer segment surface 62 has a first arcuate surface 62A extending from the lead edge 63 to approximately halfway along the outer segment surface 62, and a second arcuate surface 62B extending from approximately halfway along the outer segment surface 62 to the trailing edge 64. The first arcuate surface 62A is an arc based on a radius of 2.37 inches. The second arcuate surface 62B is also an arc based on a radius of 2.37 inches, but taken from a radial center 76A, 76B at a location different from that from the first arcuate surface. The result is that the second arcuate surface 62B is slightly depressed downward from where the first arcuate surface 62A would be if the surface continued along the same arc.

Figure 5:
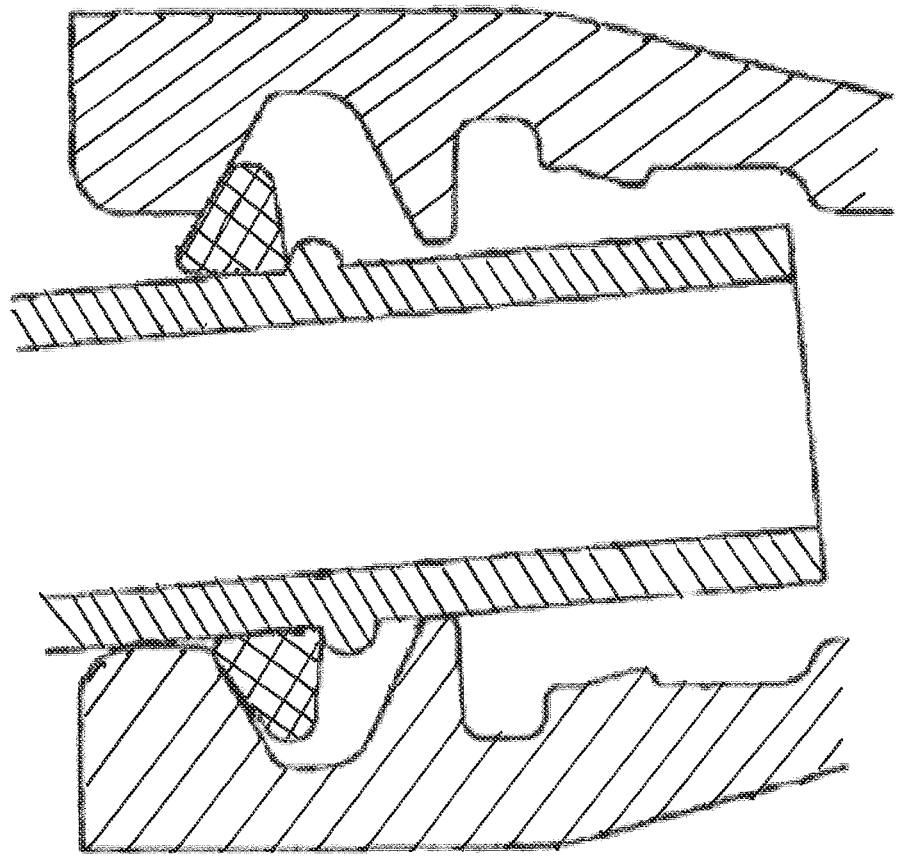
FIG. 5 depicts a prior art locking ring design.
Figure 6:
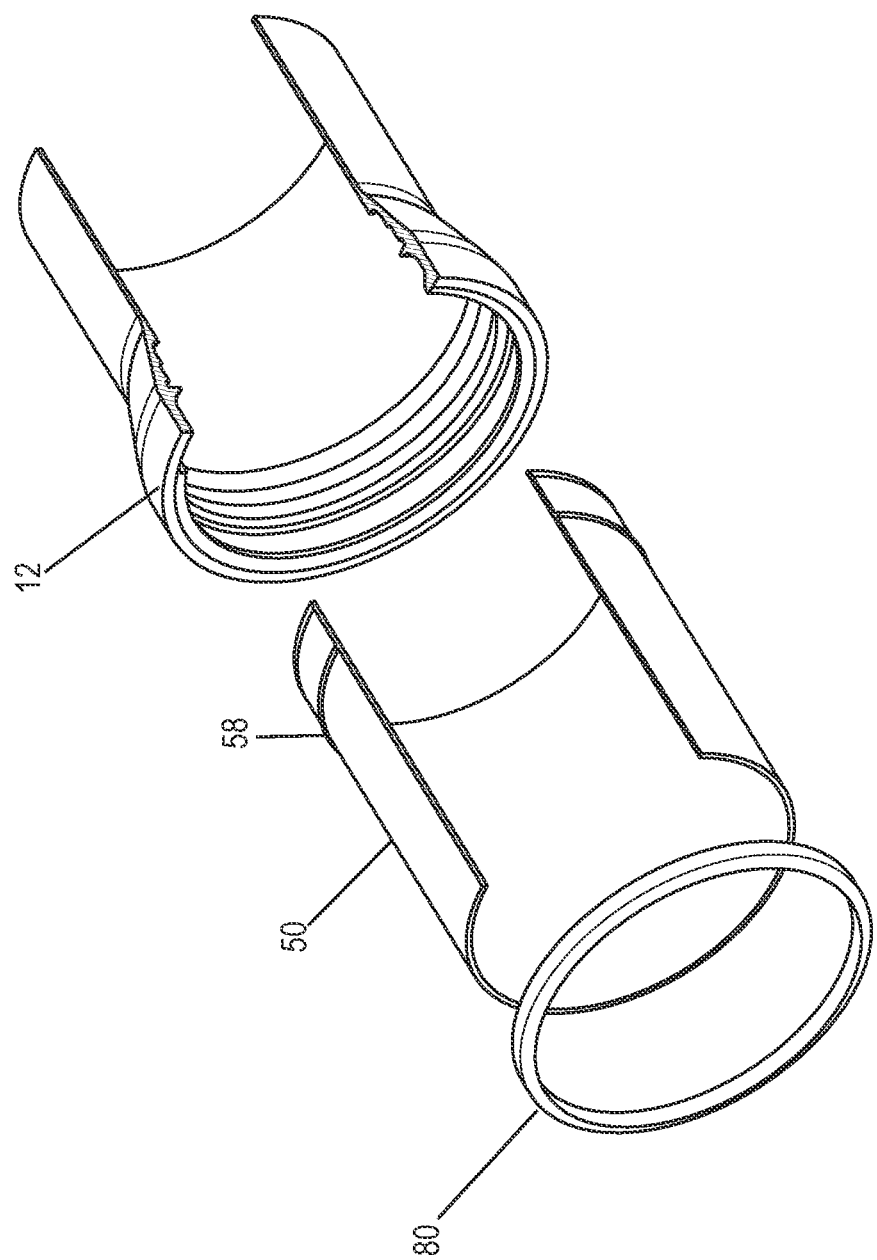
FIG. 6 depicts an integrally formed locking ring design having a compound arcuate outer surface.

The compound surface formed of multiple distinct arcuate segments is described and depicted here for particular use with the compound ring 60 formed of multiple individual ring segments 61. However, the compound surface may also be used on an integrally formed locking ring 80, that is, a locking ring 80 formed of a single piece rather than having multiple individual ring segments as described elsewhere herein. One example of an integrally formed locking ring is the "Centroidally Twistable Compression Ring for Pipe Joints" disclosed in U.S. Pat. No. 7,137,653, and which is incorporated by reference herein. The centroidally twistable compression ring is a substantially ring-shaped body inserted and lock into place in the segment cavity as described in U.S. Pat. No. 7,137,653. The ring-shaped body has a ring thrust face that can engage against the segment cavity surface. However, whereas the ring thrust face as described in U.S. Pat. No. 7,137,653 is set at a uniform face of approximately 30 degrees to the radial, the ring thrust face may instead have a compound surface formed of multiple distinct arcuate segments as described above. An example of a prior art locking ring having a uniform face of approximately 30 degrees to the radial is depicted in FIG. 5. An integrally formed locking ring having such a compound surface is depicted in FIG. 6.

The benefit of the designs disclosed herein is that the outer surface of the multiple ring segments and the inner bell surface in the segment cavity can be fashioned to provide a longer sliding distance and permit more deflection than conventional locking designs. Conventional locking rings or mechanisms do not permit significant pipe deflection at the joint before rupture. For example, the prior art design shown in FIG. 5 provides a maximum of about 0.5 degrees of deflection. In some embodiments and at some sizes, the compound locking ring disclosed herein permits approximately 2 degrees of deflection.

While the compound locking ring permits additional deflection, it was found that the individual ring segments were more likely to shift or dislocate in the course of pipe deflection than a conventional single-piece locking ring, as any individual segment may dislocate without being hindered by the adjacent independent ring segments. To resolve this issue, a protrusion may be added to the front end of the throat, effectively extending the front end of the throat into the segment cavity towards the ring segments and the weld bead. As shown in FIG. 1, the protrusion removes the space behind the weld bead opposite the locking ring and acts to block locking ring segments from becoming dislocated over or past the weld bead.

The embodiments disclosed herein may be used with any size pipe using a bell-and-spigot joint. For example, the embodiments may be used on pipes having a diameter between 4"-64", or even larger sizes. In particular, the embodiments are useful for locking the joints of high-pressure pipes to permit deflection without bursting or leaking off pressure or fluid.

Figure 8:
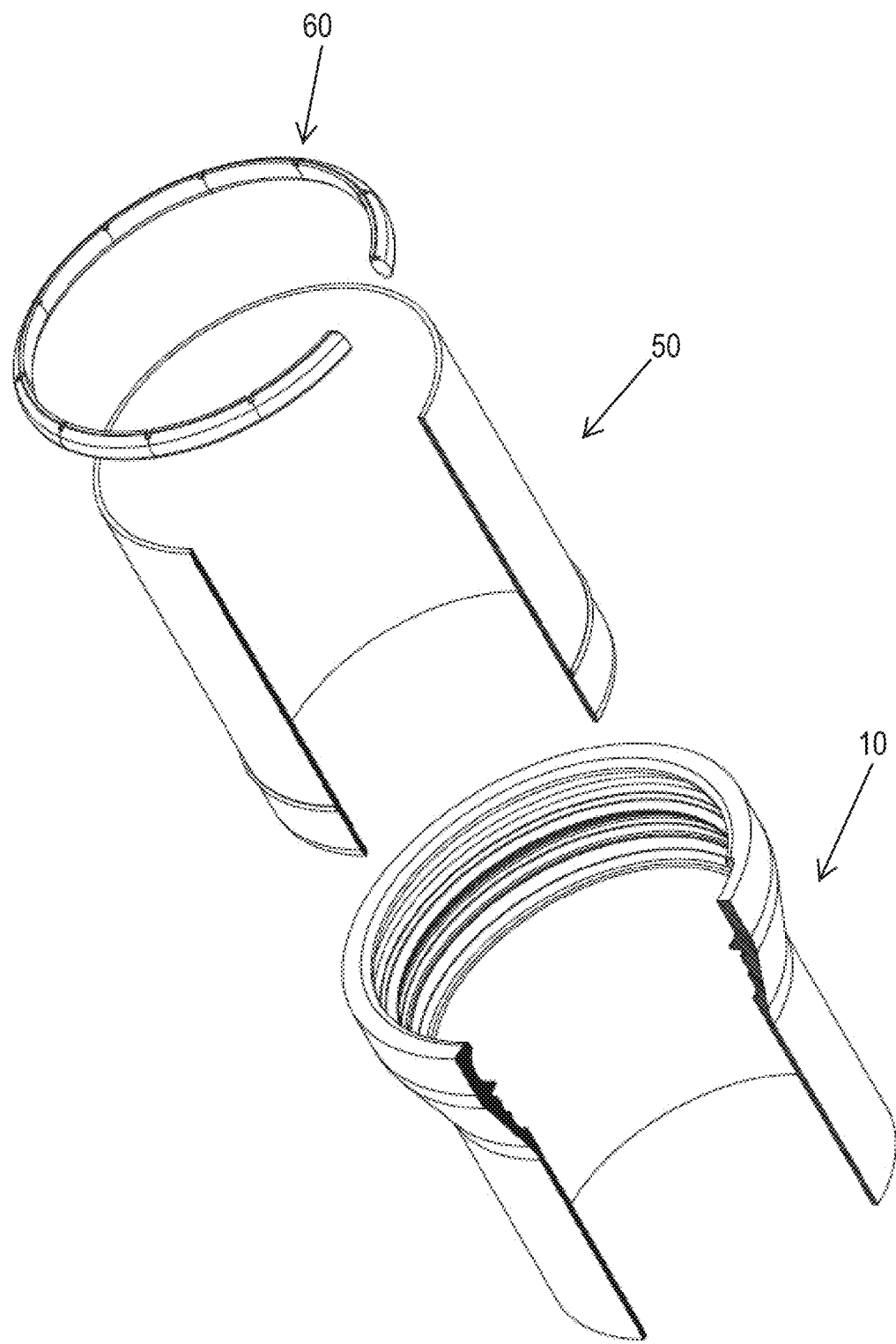
FIG. 8 depicts an exploded view of a compound ring and pipe ends according to an embodiment of the invention.

The number of segments provided in this manner may be at least 3 segments. In other embodiments somewhere between 10-30 segments, or more, may be used. In some embodiments the segments may all be uniform and have an equal arc measure around the circumference of the spigot. As a non-limiting example, in an embodiment having a 25 degree slot and uniform segments formed to pass snugly through the slot, the embodiment would utilize 15 segments. In other embodiments, the size of the segments may be variable, from thin segments to thicker segments limited only by the size of the slot. FIG. 8 depicts an exploded view of a bell end 12 of a first pipe 10, a spigot end 52 of a second pipe 50, and a multi-segment compound locking ring 60. The locking ring 60 as depicted in this view has ten segments 61 shown wrapping substantially all the way around the spigot. An eleventh section may be inserted as well.

What is claimed is:
1. A pipe joint system comprising:
a first pipe having a bell end with an outer bell surface, an inner bell surface defining a lug mouth, an arcuate segment cavity, a throat, a protrusion on a cavity-facing side of the throat, and a slot permitting access to the segment cavity;
a second pipe having a spigot end with an outer spigot surface and a weld bead extending circumferentially around the outer spigot surface and positioned toward the front of the segment cavity defined by the inner bell surface; and
a plurality of ring segments insertable into the slot, each ring segment having
an outer segment surface substantially molded to engage with the segment cavity, the outer segment surface terminating at a lead edge proximate to the lug mouth and adjacent to the outer bell surface and at a trailing edge proximate to the protrusion on the inner bell surface;

a rear segment face perpendicular to outer spigot surface and meeting the outer segment surface at the trailing edge;

an inner segment face parallel and adjacent to the outer spigot surface and meeting the outer segment surface at the lead edge; and a large notch having a surface defined to engage the weld bead, the large notch terminating on a first edge with the inner segment face and a second edge with the rear segment face, wherein the outer segment surface is defined by a first arc segment and a second arc segment, each arc segment having a beginning and an end, wherein the beginning of the first arc segment is at the lead edge, the end of the first arc segment is coterminous with the beginning of the second arc segment, and the end of the second arc segment is at the trailing edge, and further wherein the first arc segment and the second arc segment have distinct radial centers.

2. The system of claim 1 wherein the slot is located on the bell face.

3. The system of claim 1 wherein the slot is located on the bell exterior surface.

4. The system of claim 1 wherein the ring segment has a circumferentially arcuate inner surface.

5. The system of claim 1 wherein the plurality of ring segments comprises between 3 and 30 ring segments.

6. The system of claim 5 wherein the plurality of ring segments comprises 15 ring segments.

7. A method for forming a locking ring in a pipe joint comprising:

providing a first pipe having a bell end with an inner bell surface defining a segment cavity and a throat, and a slot permitting access to the segment cavity;

providing a second pipe having a spigot end with an outer spigot surface and a weld bead extending circumferentially around the outer spigot surface;

inserting the spigot end of the second pipe into the bell end of the first pipe until the weld bead engages the throat;

inserting multiple ring segments into the slot, wherein each ring segment has an outer segment surface substantially molded to engage with the segment cavity, the outer segment surface terminating at a lead edge proximate to the lug mouth and adjacent to the outer bell surface and at a trailing edge proximate to the protrusion on the inner bell surface;

a rear segment face perpendicular to outer spigot surface and meeting the outer segment surface at the trailing edge;

an inner segment face parallel and adjacent to the outer spigot surface and meeting the outer segment surface at the lead edge; and a large notch having a surface defined to engage the weld bead, the large notch terminating on a first edge with the inner segment face and a second edge with the rear segment face, wherein the outer segment surface is defined by a first arc segment and a second arc segment, each arc segment having a beginning and an end, wherein the beginning of the first arc segment is at the lead edge, the end of the first arc segment is coterminous with the beginning of the second arc segment, and the end of the second arc segment is at the trailing edge, and further wherein the first arc segment and the second arc segment have distinct radial centers;

sealing the slot.

* * * * *